FIG. 2

INVENTORS
JACOBUS JOSEPH LANGEN
MARINUS JACOBUS MARIA LANGEN
ERNEST TOPLER
BY Patrick J. Walsh
ATTORNEY

INVENTORS
JACOBUS JOSEPH LANGEN
MARINUS JACOBUS MARIA LANGEN
ERNEST TOPLER
BY
ATTORNEY

Aug. 19, 1969   J. J. LANGEN ET AL   3,461,642
METHOD AND MACHINE FOR FORMING AND SEALING A CARTON
Filed Oct. 21, 1966   10 Sheets-Sheet 10

INVENTORS
JACOBUS JOSEPH LANGEN
MARINUS JACOBUS MARIA LANGEN
ERNEST TOPLER
BY
ATTORNEY

United States Patent Office 3,461,642
Patented Aug. 19, 1969

3,461,642
METHOD AND MACHINE FOR FORMING AND SEALING A CARTON
Jacobus Joseph Langen and Marinus Jacobus Maria Langen, Rexdale, Ontario, and Ernest Topler, Toronto, Ontario, Canada, assignors to American Can Company, New York, N.Y., a corporation of New Jersey
Filed Oct. 21, 1966, Ser. No. 588,434
Int. Cl. B65b 43/00, 5/02, 1/02
U.S. Cl. 53—29                                    8 Claims

ABSTRACT OF THE DISCLOSURE

A method and machine for forming and sealing a carton from a flat carton blank. The carton is formed by a mandrel in cooperation with guide means which are positioned adjacent the path of movement of the mandrel. A conveyor also assists in formation of the carton around the mandrel. The mandrel is removed from the carton and after filling the carton is closed and sealed.

The present invention relates to a machine and method for forming and sealing cartons.

According to the present invention, a flat carton blank is made into a formed and sealed carton. The carton is made from sheet material, preferably paperboard, and is used for packaging food products such as frozen foods, which are sold to consumers in supermarkets.

A preferred practice in present day packaging methods is manufacturing carton blanks and shipping them to a packer in flat form. The packer, with suitable machinery, transforms the flat blank into a formed, filled, and sealed package for distribution to consumers. To practice this preferred packaging method, the packer must have a machine which efficiently forms, fills, and seals the cartons.

Figure 1:
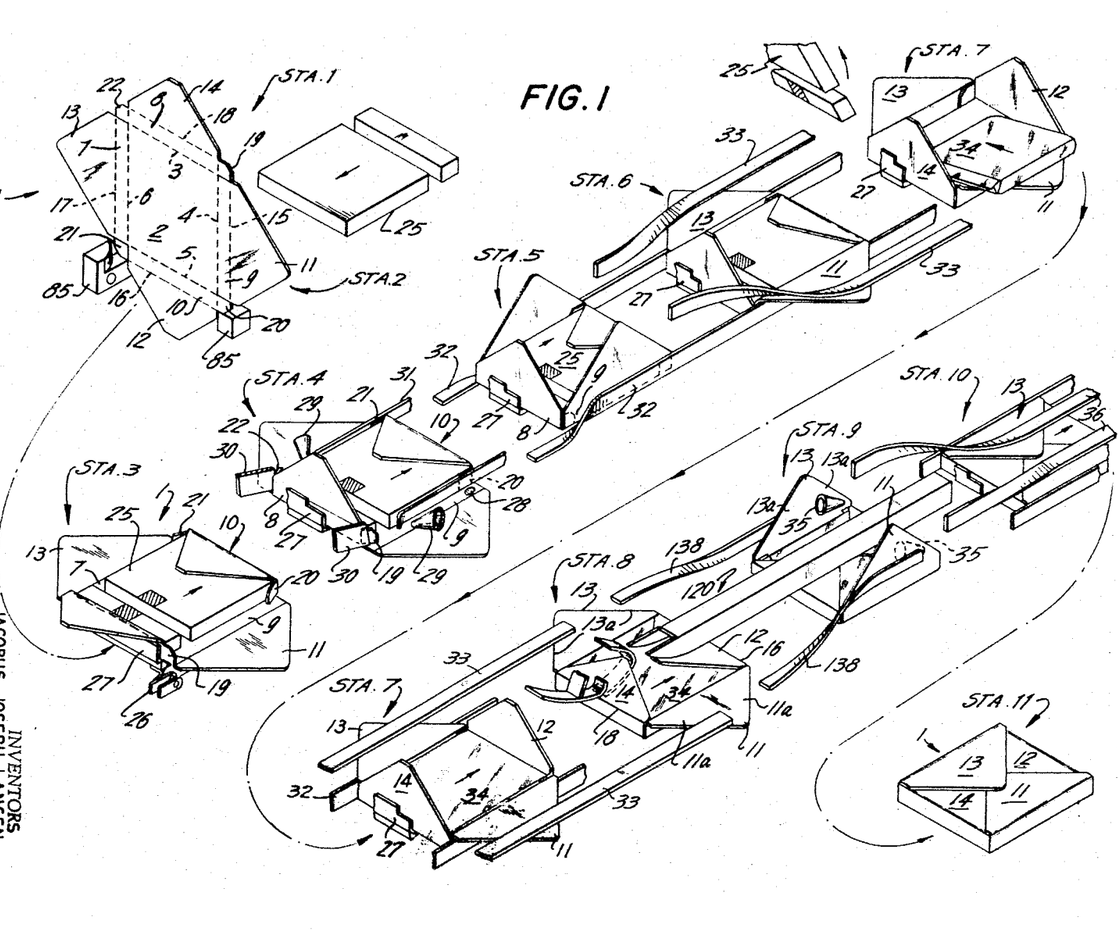
FIG. 1 is a schematic view, in perspective, illustrating the step-by-step method according to the present invention for transforming a flat carton blank (upper left) into a formed and sealed carton (lower right)

Another important consideration in packaging is economy in packaging costs. Packaging costs are reduced by using a minimum of material for making a particular package. Such a carton is shown in FIG. 1 of the drawings and this carton may be described as an envelope-type package. It will be observed that the carton may be formed from a generally rectangular sheet of paperboard somewhat like a mailing envelope. There is a minimum of overlapping between edges of the sealed carton and there is a minimum of waste material which must be cut away in order to form the carton blank. Such a carton has been described in the United States patent to Bonini et al. No. 2,852,133 owned by the assignee of the present invention.

Although the economies of the envelope-type carton is well-known, nevertheless, the carton has not met with wide spread acceptance because of the lack of a suitable machine for forming and sealing the carton. The Bonini patent, for example, uses a gummed label to overlie and seal the triangular closure flaps of the carton. The gummed label adds to the complexity of forming and sealing the package and subtracts from the economy of the envelope-type package.

The present invention provides a machine and method for forming and sealing an envelope-type carton. The machine runs continuously and sets up the flat blank into a formed carton ready for filling (which may be done by hand). After filling, the closure flaps receive adhesive and the machine seals the closure flaps of the carton.

An object of the present invention is to provide a machine and method for forming and sealing cartons.

Another object of the present invention is to provide a machine and method for forming and sealing an envelope-type package.

Other and further objects of the present invention will occur to one skilled in the art upon employment of the invention in practice.

A preferred embodiment of the present invention has been chosen for purposes of description and illustration and is shown in the accompanying drawings wherein:

FIGS. 4 and 5 are fragmentary views illustrating in sequence the movement of a carton blank from the feeding station to the mandrel pick up station, and from the pick up station through the guide rails to the main conveyor; FIG. 5, in addition, illustrates the first gluing operation for forming the receptacle portion of the carton;

Carton

FIG. 1 illustrates the kind of carton formed and sealed by the machine according to the present invention. As shown in the upper left hand corner of FIG. 1, a blank of sheet material 1, preferably paperboard, is cut and scored to form a carton blank. The carton blank includes a receptacle portion defined by a bottom panel 2 connected by scored lines 3–6 to four side walls 7–10. The receptacle portion including the bottom panel and the side walls is enclosed by means of four triangular closure flaps 11–14, each connected by a scored line 15–18 to a side wall. Four dust flaps 19–22 provide for securing the side walls together in upstanding fashion when the carton is formed. At the lower right hand corner of FIG. 1, the formed carton 1 is illustrated. The carton is sealed by securing the overlapping closure flaps 11–14 to each other along marginal edges. In this manner, the carton is tightly sealed to preserve the contents and present an attractive appearance.

General description of machine operation

FIG. 1 illustrates in schematic fashion the method of transforming the blank into a carton which method is preferably performed by the machine of the present invention. While the description of the machine refers to stations, it is to be understood that the machine runs continuously; and the machine forms and seals the carton at these various stations or locations. Reference to stations, therefore, does not mean that the machine moves intermittently or is indexed from station to station in forming and sealing the carton.

Stations 1 and 2 are illustrated in FIG. 1 and indicate movement of the carton blank 1 from a hopper or stacked position (station 1) to a mandrel pick up station 2. A carton forming mandrel 25 engages the front wall 10 of the carton blank at the mandrel pick up station 2.

The carton blank 1 and forming mandrel 25 meet a carton forming conveyor 26 at station 3 where carton formation begins. At station 3, a pair of spaced lugs 27 on the carton forming conveyor 26 set up the front and rear walls 10 and 8 of the carton 1.

After joinder, the conveyor and the mandrel move the carton to station 4 where the side walls 7 and 9 of the carton receive spots of glue 28 for securing the side walls 7–10 and the dust flaps 19–22. A nozzle 29 deposits each spot of glue 28 on each side wall 7 and 9 adjacent each dust flap. A pair of rotating arms 30 tuck the rear dust flaps 19 and 22 behind a pair of guide rails 31 to position them inside the side walls 7 and 9.

After the glue is applied, the carton moves to station 5 where the side walls 7 and 9 of the carton are plowed up by guide rails 32, which cooperate with the side faces of the mandrel 25 and the conveyor lugs 27 to secure the side walls 7 and 9 to the dust flaps 19–22 and form the receptacle portion of the carton.

At station 6, the side closure flaps 11 and 13 are plowed out of the way by suitable guide rails 33 so that the carton is in best position for receiving a pouch 34 containing a food product at station 7. It will be observed also at station 6 that the carton forming mandrel 25 lifts out of the carton and continues in its return orbit to pick up a subsequent blank for repetition of the carton forming operation.

After filling, the carton moves to station 8 where the trailing closure flap 14 is folded along its scored line 18. Next the carton moves to station 9 where the side closure flaps 11 and 13 are guided into upright position for receiving a strip of closure glue. The glue is applied by nozzles 35 along the marginal edges 11a and 13a of the side closure flaps. After gluing, the carton moves to station 10 where the closure flaps 11 and 13 are plowed to a closure position and sealed by suitable guide rails 36.

At station 11, the sealed carton is delivered from the machine.

Carton blank stacking and feed—station 1

Figure 2:
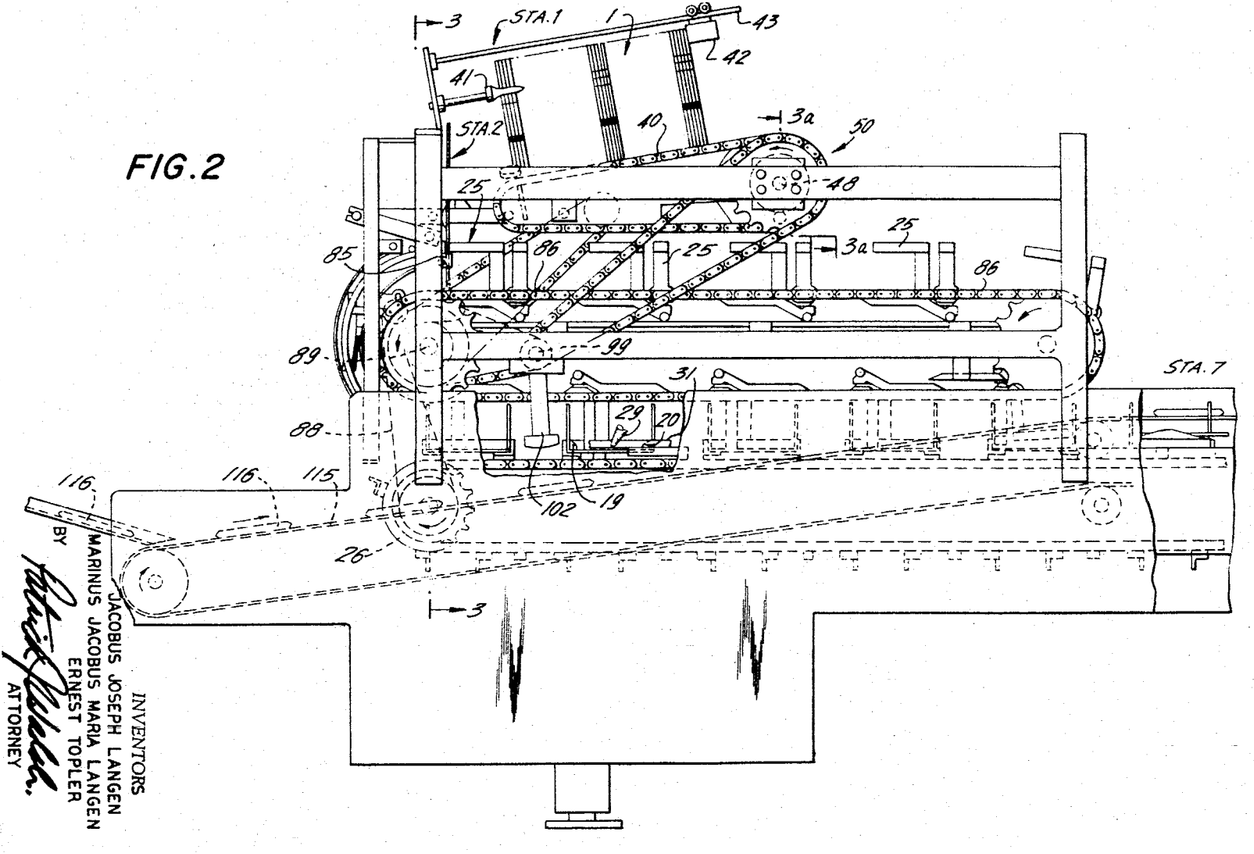
FIG. 2 is a side elevation view of the preferred embodiment of the present invention illustrating stations 1 through 7 of the present invention.
Figure 3:
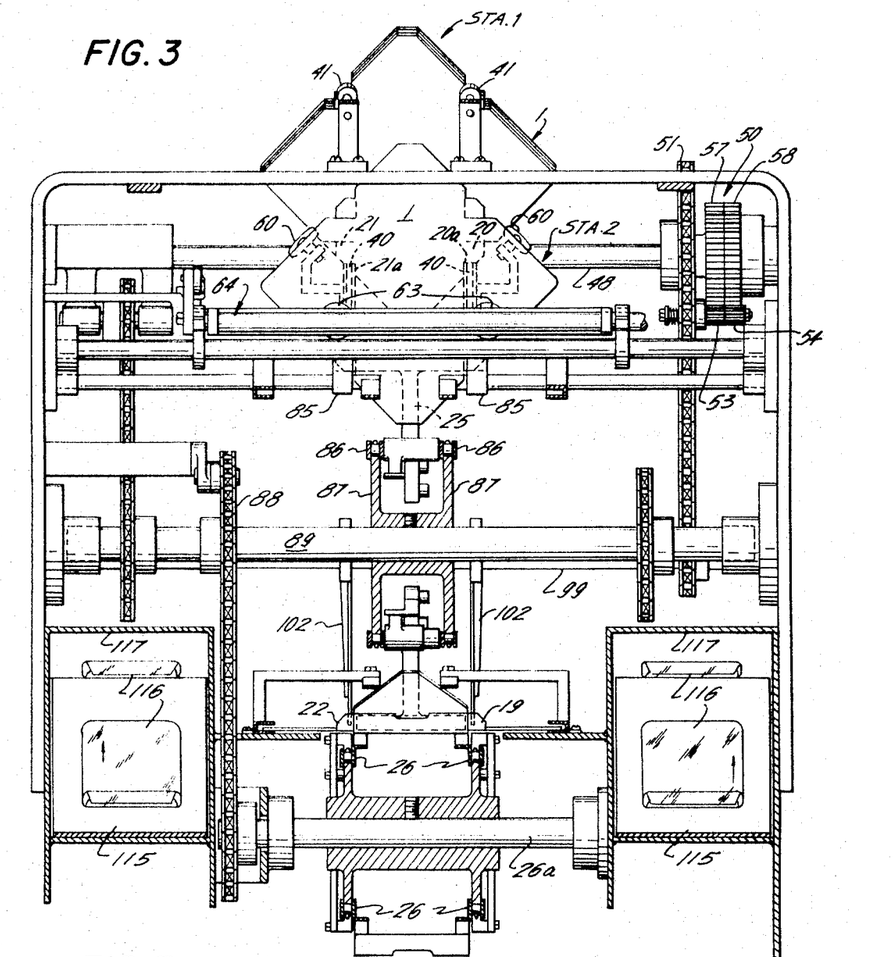
FIG. 3 is a section view taken through line 3—3 of FIG. 2 to illustrate the mechanisms for feeding carton blanks and for beginning the forming operations.
Figure 4:
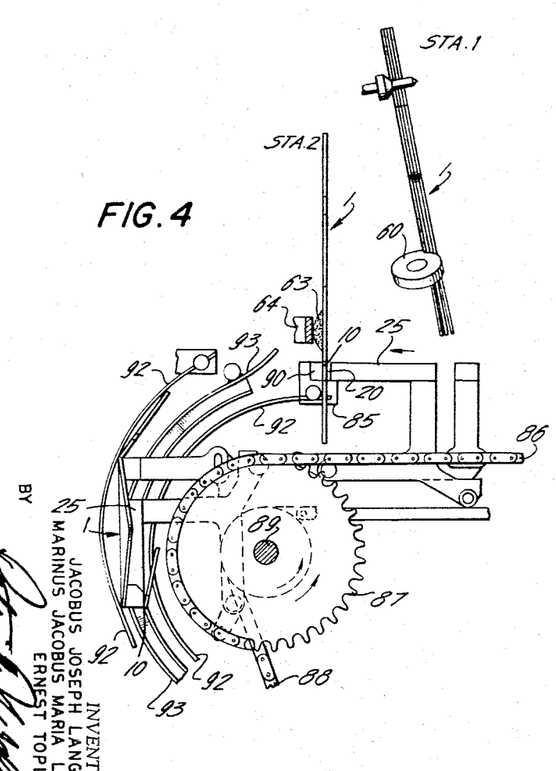

As best shown in FIGS. 2, 3 and 4, the carton blanks 1 are stacked at station 1 and move one by one to station 2 for pick up by the carton forming mandrel 25.

A novel arrangement for stacking the cartons at station 1 has been devised and will be described in detail to give full appreciation of the present invention.

Referring to FIGS. 2 and 3, the carton blanks 1 are stacked on a pair of chains 40 which engage the notches 20a and 21a in the carton blanks under the lower dust flaps 20 and 21. This engagement is shown in broken lines in FIG. 3. A pair of spaced pins 41 support the front end of the carton stack 1 and a suitable weight 42 prevents collapse of the rear section of the carton stack 1.

The feed of the carton blanks is continuous in nature and is not affected by the weight or number of stacked carton blanks at station 1. To accomplish this, the stacking chains 40 move continuously at a slow rate of speed in timed relation with the movement of other machine components. In this manner, after the leading carton blank leaves the stack, the remaining blanks advance as a unit on the slowly moving stack chains 40. The rear end weight 42, mounted on a rail 43, moves freely with and stabilizes the diminishing stack.

Figure 6:
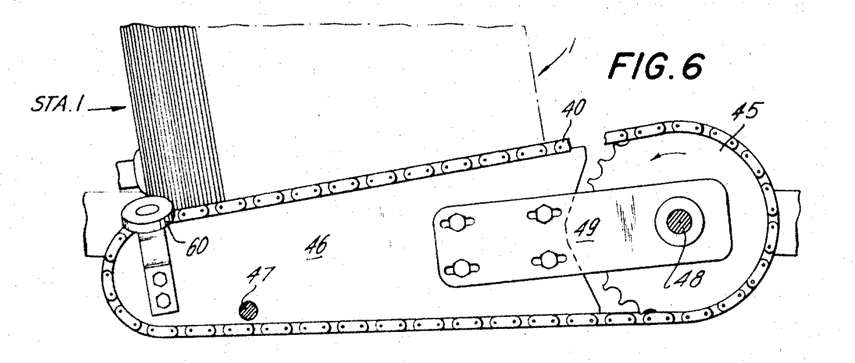
FIG. 6 is a side elevation view of the stacking mechanism for feeding carton blanks to the forming portion of the machine.

The stacking chains are best illustrated in FIGS. 2, 3 and 6. Each chain 40 (FIG. 6) is mounted for rotation on a sprocket 45 and a guide plate 46. The guide plate 46 absorbs the weight of the carton blanks upon the chain and keeps the chain in taut condition. The sprocket 45 and guide plate 46 are mounted in a suitable manner on the machine frame by a support rod 47 and a drive shaft 48. An adjustable arm 49 fixes the guide plate 46 to the drive shaft 48.

Figure 3A:
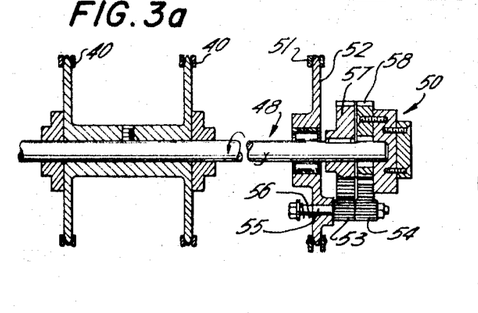
FIG. 3a is an elevation view partly broken away of the reduction gear for driving the stacking chain.

The slow movement of the stack chains 40, is accomplished by a reduction gear 50 best illustrated in FIGS. 3 and 3a. The reduction gear 50 receives input power from a chain and sprockets 51 and 52 and delivers power at a reduced speed to the drive shaft 48 for the stacking chain sprockets. The input sprocket 51 carries a pair of pinions 53 and 54 which are pressed together on a shaft 55 by a suitable spring 56. Each pinion 53 and 54 meshes with and orbits around a pair of larger gears 57 and 58 as the input sprocket 52 rotates during machine operation. The outer gear 58 is fixed to the machine housing and does not rotate. The outer gear includes a specific number of teeth, for example, 72 teeth. The inner gear 57 is keyed to the shaft 48 which drives the stack chain sprockets. The inner gear 57 includes 73 teeth (one more than the outer gear), and as the pinions orbit about the larger gears, the inner gear 57 rotates a distance equal to one tooth pitch for each revolution of the drive pinions. Therefore, the inner gear and the drive shaft 48 turn one revolution for each 73 revolutions of the input sprocket 52. The input sprocket is synchronized with other machine drives; the stack chain 40 moves at a very slow speed in timed relation to overall machine movement. Thus, the carton stack chain 40 moves positively and slowly toward station 1 as the machine operates.

One of the important features of the present invention which insures smooth transition of carton blanks 1 from the stack to station 2 for mandrel pick up is a pair of separating wheels 60 best shown in FIGS. 3, 4, 5 and 6. The separating wheels 60 bow outwardly the leading carton blank in the stack from the rest of the stack. This bowing action prevents the cartons from sticking together during the feeding operation. Without these wheels, the second and possibly third cartons in the carton stack could be dragged along and foul the machine operation. Applicants' have found that a resilient substance such as an acrylonitrite rubber mounted on a suitable metal core gives the desired bowing action to the cartons.

Carton blank transfer—station 1 to station 2

In the next operation, the machine transfers a carton blank 1 (FIG. 2) from the head of the stack at station 1 to the mandrel pick up station 2. For successful operation, the machine must pick one blank from the stack, grasp the blank firmly for delivery to station 2, and release the blank in precise position for engagement by the carton forming mandrel.

Figure 7:
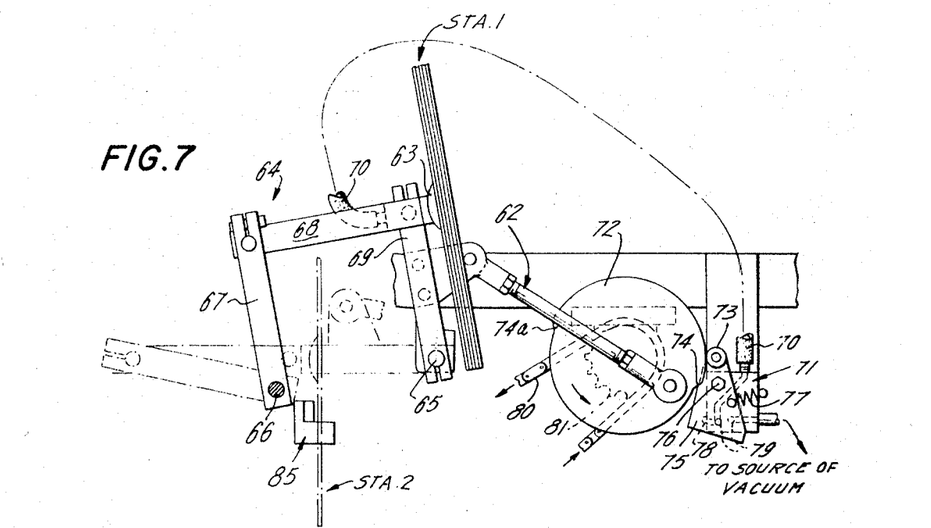
FIG. 7 is a side elevation view of the mechanism for transposing the carton blanks from the carton blank feeding station to the mandrel pick up station.

As illustrated in FIGS. 3, 4 5, and 7, the preferred arrangement for carton blank transfer includes a pair of spaced suction cups 63 on a frame 64 which reciprocates between station 1 and station 2 (FIG. 7). The frame 64 (FIG. 7) comprises a pair of fixed shafts 65 and 66 which support the frame members 67–69. Each suction cup is mounted intermediate the ends of the frame 64. The frame, it will be observed, is nearly a pantograph, i.e. the top member 68 of the frame is slightly shorter than the distance between the fixed shafts 66 and 65. In this way, tilted blanks at station 1 are delivered in the vertical at station 2. A crank 62 connected to a drive wheel 72 reciprocates the frame 64 between stations 1 and 2.

Each suction cup 63 is connected to a vacuum source during transfer of carton blanks to sation 2. At station 2, the vacuum is released for easy disengagement and return of the suction cup mechanism to station 1. As shown in FIG. 7, each suction cup 63 is connected to a vacuum source through a suitable hose 70 and manifold 71. A cam wheel 72 and cam follower 73 cooperate to connect and disconnect the suction cups to the vacuum source in timed relation to the transfer and return strokes of the suction cups. In the solid line position shown in FIG. 7, the suction cups are returning to the stack 1 and the vacuum is cut off. When the cam follower 73 rolls down the cam incline 74, the cam follower housing 75 pivots at 76 by means of a spring 77 and a manifold 78 connects a pair of spaced ports 79. Thus, the suction cups are connected to a vacuum source to transfer the carton blanks to station 2. A corresponding incline 74a on cam wheel 72 cuts off the vacuum after delivery of the blanks to station 2.

A suitable drive such as a chain 80 and sprocket 81 coordinate movement of the suction cup mechanism with other machine movements.

Mandrel pick up of carton blank—station 2

At station 2, the carton blank is delivered to a pair of retainer bars 85 where the carton forming mandrel 25 engages the carton blank and moves the blank onward to carton forming stations 3 through 6. (See FIG. 1,)

Figure 9:
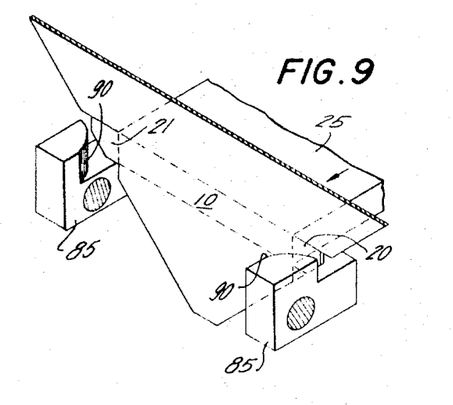
FIGS. 9 and 10 are detailed views illustrating the interaction between the carton blank and the carton mandrel at the mandrel pick up station.
Figure 10:
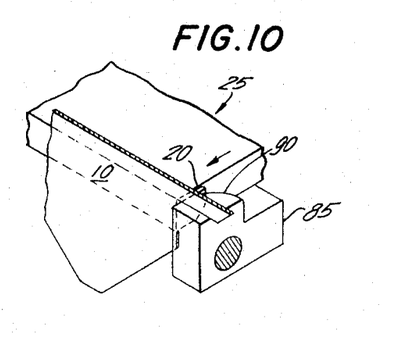

As shown in FIGS. 2, 3, 4 and 5, each mandrel 25 is preferably mounted between a pair of chains 86 each of which pass over a pair of spaced sprocket wheels 87, which are driven by a suitable chain 88 and shaft 89. The mandrel (FIG. 4) engages the carton blank with the front wall of the mandrel in registry with the front wall 10 of the blank. The mandrel takes control of the carton blank and pushes the blank off the retainer bars 85. A cam surface 90 on the retainer bars pre-breaks the dust flaps 20 and 21 about their scored lines as the blank moves off the retainer bars. This action is illustrated best in FIGS. 9 and 10. The pre-breaking of the dust flaps facilitates formation of the receptacle portion of the carton in a subsequent operation.

Figure 5:
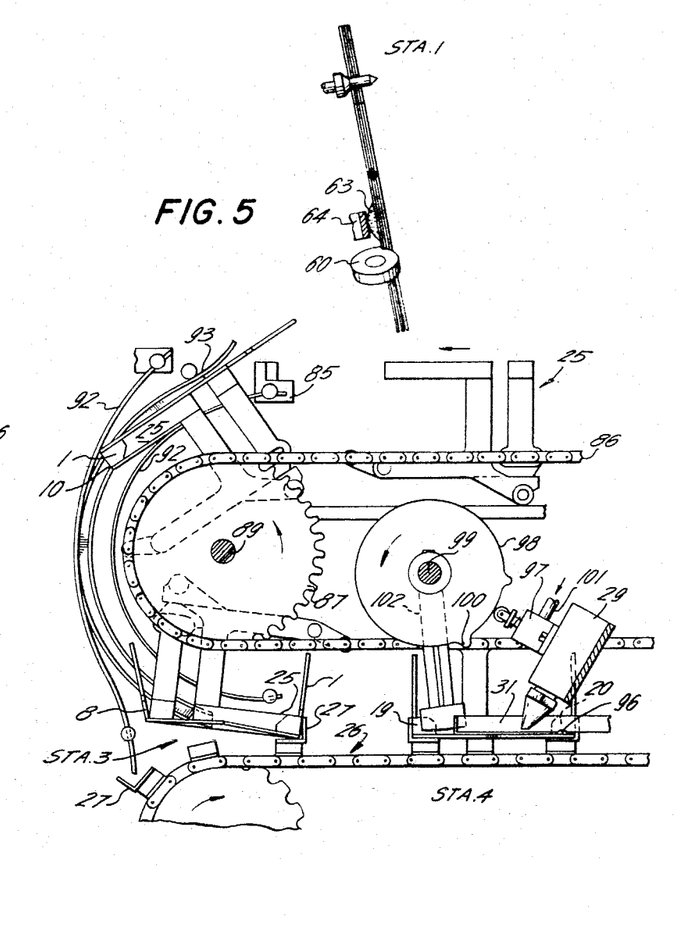
Figure 8:
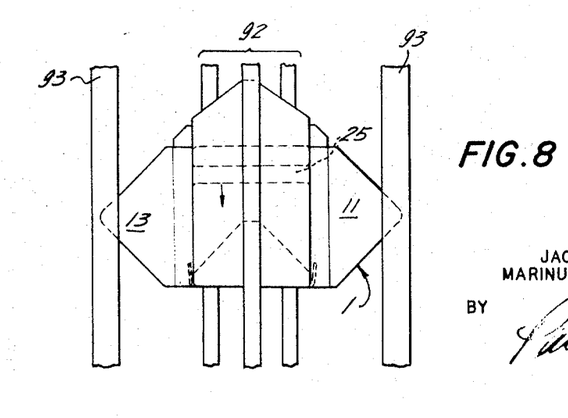
FIG. 8 is a fragmentary view of guide rails which control the movement of the carton blank from the mandrel pick up station to the main conveyor of the machine.

After the carton pick up (FIGS. 4 and 5), the mandrel moves its carton blank into the guide rails shown in FIGS. 4, 5 and 8. The guide rails include a grouping of three cooperating guide rails 92 and spaced U-shaped rails 93 which guide the extreme tips of the carton. The three guide rails (preferably made of spring steel) hold the center portion of the blank 1 in position on the mandrel 25 during movement to station 3. The guide rails are mounted in position by suitable clamps 94 which allow flexing of the guide rails 92 during movement of the mandrel and blank. The U-shaped rails guide the tips of closure flaps 11 and 19 during movement to station 3.

Formation of carton—stations 3–6

At station 3, as shown in FIG. 5, the conveyor 26 meets the carton blank 1 and mandrel 25. The mandrel and the conveyor cooperate in forming the receptacle portion of the carton. The conveyor includes a pair of spaced lugs 27 which engage the front and rear walls of the blanks 10 and 8. The conveyor lugs 27 and the mandrel 25 fix the positions of the front and rear blank walls 10 and 8 while the side walls are secured to the dust flaps 19–22 at stations 4 through 6.

Figures 11, 12, 13:
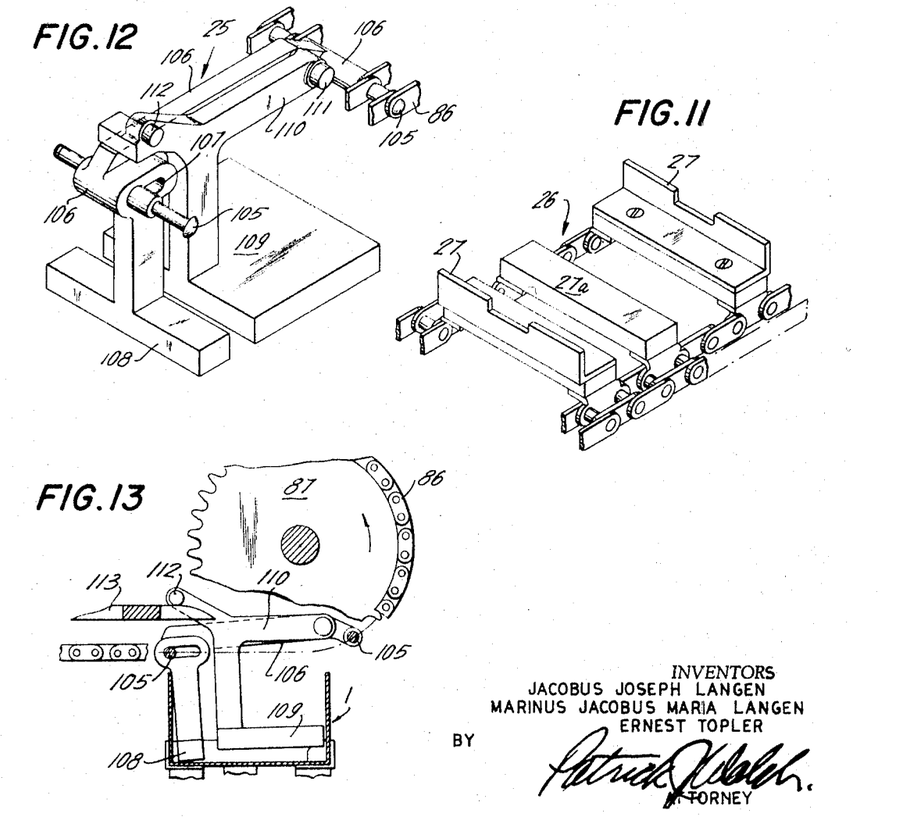
FIG. 11 is a perspective view illustrating the construction of the main conveyor of the machine.
FIG. 12 is a perspective view illustrating the carton forming mandrel.
FIG. 13 is a side elevation view illustrating the action of the carton forming mandrel as it contracts and lifts out of a formed carton.

The construction of the conveyor 26 is illustrated in FIG. 11 and includes spaced lugs 27 and a center support bar 27a.

As shown in FIGS. 1 and 5, the formation of the receptacle portion of the carbon begins at station 4 where a suitable adhesive is applied to the side walls of the blank. Preferably a spot 96 of adhesive is applied opposite each dust flap 19 and 20 by means of spaced nozzles 29. Each nozzle may include a suitable valve 97 actuated by a cam wheel 98 on a shaft 99 moving in timed relation to conveyor 26 movement. The cam wheel includes a pair of cam surfaces 100 for controlling adhesive flow between inlet 101 and nozzle 29.

A pair of rotating arms 102 keyed to the drive shaft 99 (FIGS. 1, 2, 3 and 5) tuck the rear dust flaps 19 and 22 under a guide rail 31 prior to depositing glue on the side wall adjacent the rear dust flaps.

A pair of guide rails 32 (FIG. 1) plow up the side walls 7 and 9 of the receptacle portion of the carton for formation of the receptacle. After formation, the side closure flaps are plowed by guide rails 33 out of the way in preparation for filling at station 7. Meanwhile, between stations 6 and 7 the carton forming mandrel 25 separates from the carton and leaves on its return orbit for a repetition of the carton forming cycle.

In forming the carton, the mandrel 25 and the conveyor lugs 27 fit snugly around the carton receptacle as noted above. After formation of the carton, the mandrel orbits out of the carton without stretching or tearing the carton.

The mandrel collapses slightly as it lifts out of the carton so as to clear the carton side walls without damage. Mandrel collapse will be better understood from the construction of the mandrel (FIGS. 12 and 13).

Spaced pins 105 support each mandrel on the orbiting chain 86 by a main support bar 106. The rear pin 105 fits into an elongated hole 107 to accommodate shifting of the pins as the support chain moves around the drive sprocket 87 (FIG. 13). A depending heel member 108 defines a rear portion of a carton forming surface. The forward portion 109 of the carton forming surface depends from a pivoting bar 110. The bar 110 pivots by a pin connection 111 to the main support bar 106. This pivoting action occurs (FIG. 13) after station 6 when a cam follower 112 on the mandrel engages a suitably placed cam surface 113. As shown in FIG. 13, the mandrel collapses for removal from the carton 1 when the forward end (pin 105) starts to circle the sprocket 87 (thereby tilting the heel 108 forward) and the cam 113 pivots rearwardly the forward portion 109 of the mandrel. The collapsed mandrel then separates without injury to the carton.

Carton filling—station 7

As shown in FIG. 1, filling of the formed carton occurs at station 7. The filling operation may be done automatically or by hand. If desired, food pouches may be delivered to the filling station on opposite sides of the machine. For example, as shown in FIGS. 2 and 3, inclined conveyors 115 carry pouches 116 through tunnels 117 on each side of the machine. The conveyors 115 deliver the food pouches at station 7 for convenient filling of the formed cartons.

Carton closure—stations 8 through 10

After filling, the main conveyor delivers the cartons to stations 8 through 10 for closure and sealing. In FIG. 1 station 8, the leading and trailing closure flaps 12 and 14 are plowed under a holding bar 120. The leading flap 12 engages the holding bar and pivots about its upper scored line 16. There is no difficulty with this pivoting action of the leading closure flap because the scored line 16 was pre-broken at station 2 when the mandrel picked up the carton blank and moved the blank to station 3.

However, the rear flap has not been pre-broken and care must be taken to fold this closure flap about the upper scored line. Applicants have devised a unique mechanism for folding the rear closure flap.

Figure 14:
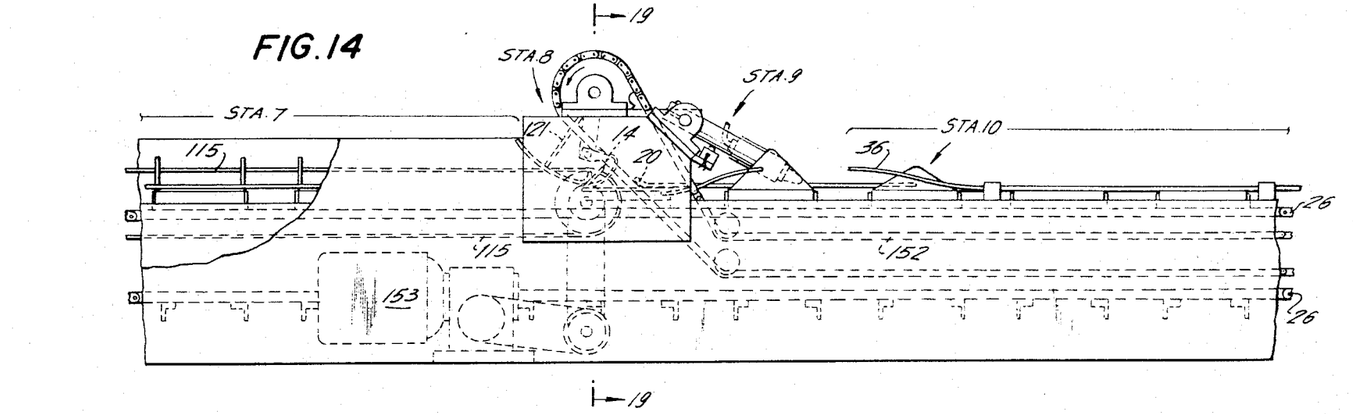
FIG. 14 is a continuation of FIG. 2 illustrating in side elevation stations 7 through 10 of the carton forming machine of the present invention.
Figure 15:
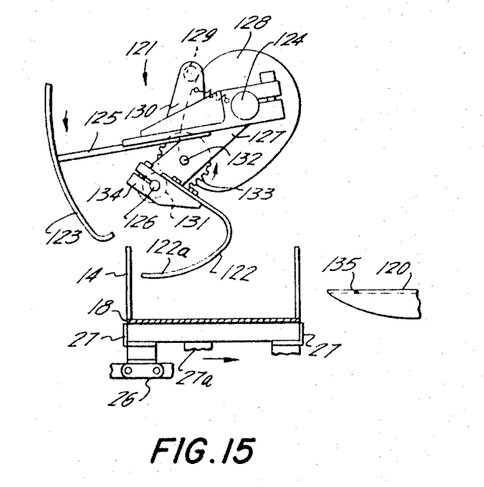
FIGS. 15–18 are schematic sequence views of a mechanism for closing the trailing flap of the carton.

As shown in FIG. 14 (station 8), a kicker mechanism 121 pivots the rear closure flap 14 about the upper scored line into position under the flap holding bar 120. The mechanism for pivoting the rear closure flap is illustrated in action in FIGS. 15 through 18. The rear flap kicker mechanism 121 includes a pair of spaced arms 122 and 123, which cooperate to bend the rear closure flap 14 along the upper scored line 18. The tip 122a of the forward arm engages and supports the inside of the rear wall 8 at the scored line 18, while the rear arm kicks down the flap. This combined action produces the desired folding of the rear closure flap 14.

Since the carton 1 and the kicker mechanism are in motion and assume changing positions, the action is illustrated in sequence in FIGS. 15 through 18.

The rear kicker arm 123 moves in a circular orbit and is keyed to a rotating shaft 124 by a suitable arm 125. The shaft 124 is driven in timed relation to the movement of the conveyor 26 so that the kicker arm 123 always engages flap 14 from the rear. Thus the arm 123 provides the force for kicking down the rear closure flap 14.

Accurate folding of the flap 14 about scored line 18 requires the use of means for supporting the rear wall 8 of the carton at the scored line 18. The forward arm 122 provides support at the scored line. As shown in FIGS. 15 through 18, the rear arm 122 performs a pincer-like movement with respect to the rear arm 123. In this pincer-like movement, the arms 122 and 123 approach the flap 14 from the front and the rear to perform the necessary supporting and kicking functions.

To achieve the pincer-like movement, the forward arm 122 pivots at 126 on a suitable arm 127. The arm 127 is fixed to rotating shaft 124 and is in fixed angular relation to the rear support arm 125.

A cam 128 and cam follower 129 pivot the forward kicker arm 122 by means of a crank 130 and a gear train 131. The spring loaded crank 130 oscillates about a pivot point 132 as it follows around the fixed cam 128. The crank 130 then turns the gear 133 which meshes with another gear 134. Gear 134 is fixed with arm 122 to pivot at 126.

The combined action of the cam gears is a pincer-like movement of arm 122 toward arm 123 as the shaft 124 turns.

Figure 16:
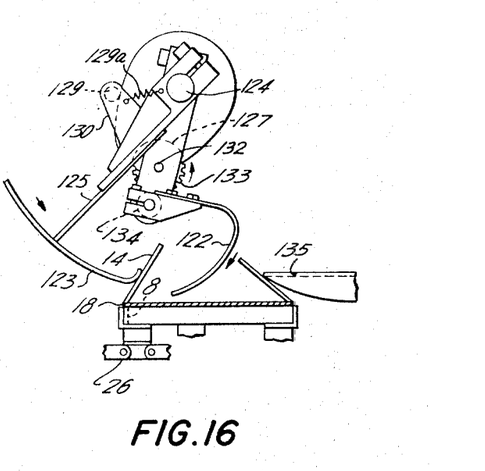

In FIG. 16, the rear arm 123 has engaged the flap 14 while the forward arm 122 by virtue of its cam and gear arrangement closes the gap and approaches the rear wall 8. Both gears 133 and 134 may rotate by their shaft connections to the arm 127. The cam follower 129 (spring loaded at 129a) moves crank 130 and turns gear 133 when following the cam surface 128. The forward arm 122 responds to the crank action by virtue of its fixed connection to the driven gear 134. In this manner, the arms 122 and 123 cooperate to kick down the rear flap about the top scored line 18 and not the bottom scored line 3. The cam surface 128 is arranged so that arms 122 and 123 close in on the rear flap 14 as in FIGS. 16 and 17. The shaft 124 drives the kicker mechanism in timed relation to conveyor movement so that the kicker will meet a carton as illustrated.

Figure 17:
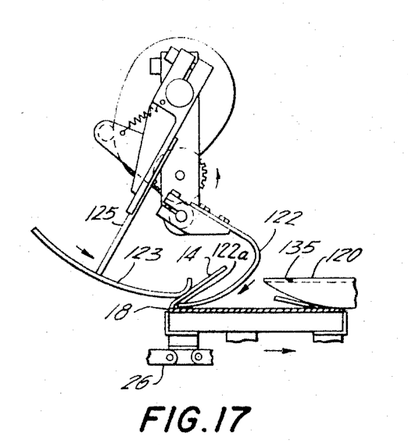
Figure 18:
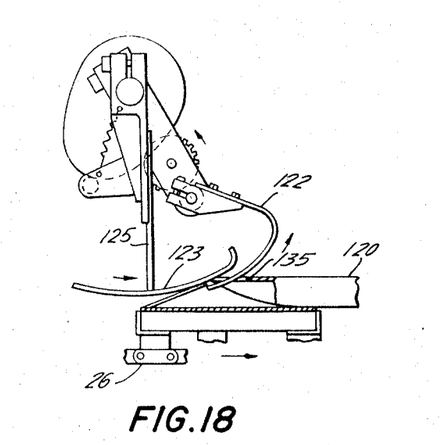

In FIG. 17, the folding action reaches a climax as the tip 124 of the forward arm 122 is in contact with the scored line 18 and the rear arm 123 is moving the flap 14 into position under the holding bar 120. In FIG. 18, the forward arm 122, having served its purpose, is cranked forward by the cam and gear mechanism. The rear arm 123 has now lowered the closure flap under the retainer bar 120. Having done so, the rear arm 123 moves past the flap retainer 120 on its return orbit. If desired, the flap retainer may be recessed as at 135 to accommodate movement of the rear arm in its return orbit.

Figure 19:
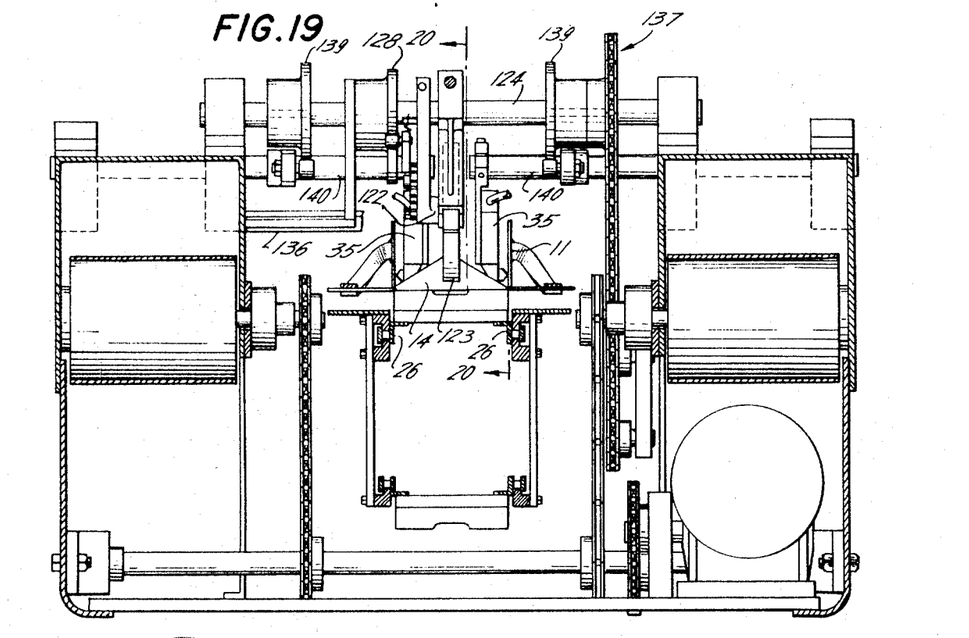
FIG. 19 is a section view taken through line 19—19 of FIG. 14 to illustrate the mechanism for applying hot melt to the closure flaps of the present invention.

FIG. 19 is a section view through station 8 of the machine and in particular illustrates the mounting and drive mechanisms for the rear flap kicker mechanism. The fixed cam 128 is suitably mounted to the frame of the machine by a suitable bracket 136. The forward 122 and rear 123 kicker arms are mounted for rotation on the drive shaft 124, which is driven by a suitable chain and sprocket 137.

Application of glue to closure flaps—station 9

Referring once again to FIG. 1 station 9, the side closure flaps 11 and 13 are plowed by rails 138 to an upright position as the carton moves from station 8 to station 9. At station 9 during application of glue, the closure flaps are retained in the upright position by the rails 138.

A suitable adhesive, such as hot melt, is applied along the marginal edges 11a and 13a of each side closure flap 11 and 13 by a pair of spaced adhesive dispensing nozzles 35.

Figure 20:
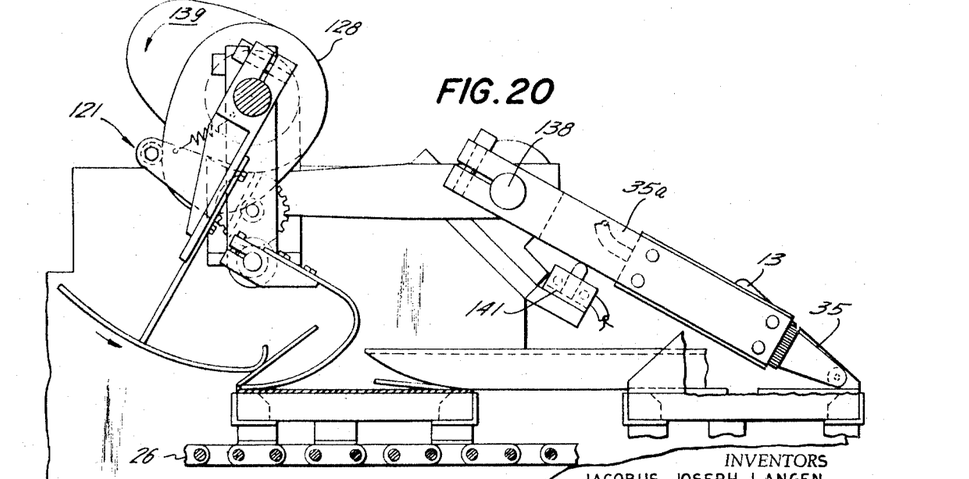
FIG. 20 is a section view taken along line 20—20 of FIG. 19 to illustrate in side elevation the mechanism for pre-breaking the back closure flap of the carton and the mechanism for applying glue to the side closure flaps of the carton.
Figure 21:
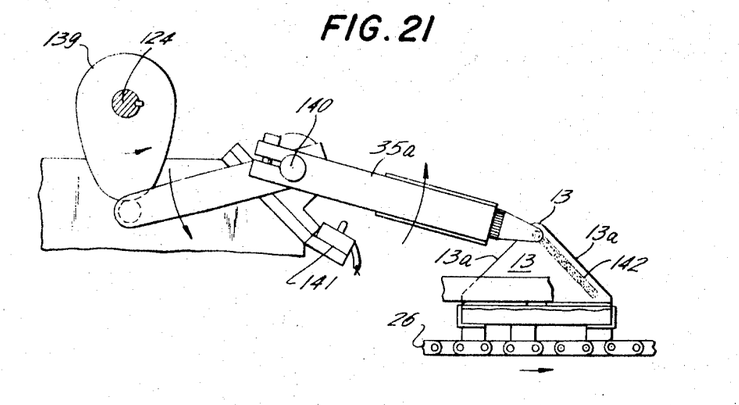
FIGS. 21–22 are schematic views showing the sequence for applying glue to the closure flaps.
Figure 22:
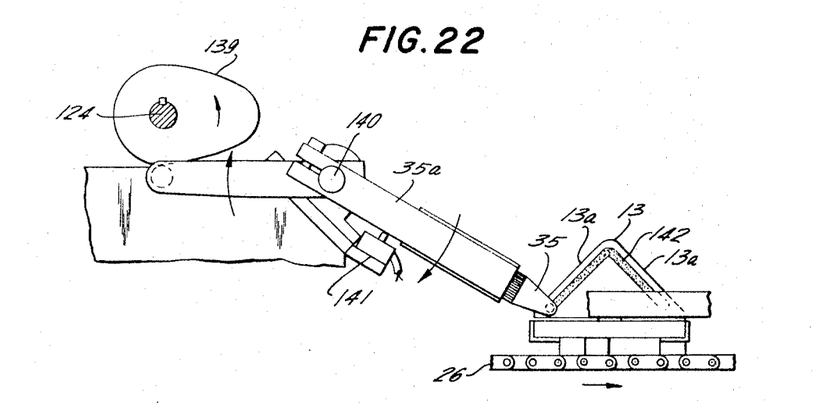

The adhesive nozzles are shown in FIGS. 19 and 20. Each pair of spaced nozzles is oscillated up and down by a suitable cam mechanism. As the shaft 124 rotates each cam 139 (FIGS. 20–22) each nozzle pivots at shaft 140 and lifts in a particular rate of speed to follow the marginal edges 11a and 13a of the moving closure flaps. Each cam 139 also lowers its nozzle 35 to follow the marginal edges 11a and 13a. This action is shown in sequence in FIGS. 20, 21 and 22. A cut-off switch 141 controls the flow of pressurized adhesive or hot melt 142 through the nozzle 35. When in the down position, the nozzle body 35a engages the cut-off switch 141 to stop flow of adhesive.

FIGS. 1 and 14 illustrate in suitable detail the sealing bars 36 which lower and seal the side closure flaps of the carton.

After a sufficient dwell period through station 10 (FIG. 23), the cartons are delivered from the main conveyor to an auxiliary conveyor for further handling.

The drive mechanism

Figure 23:
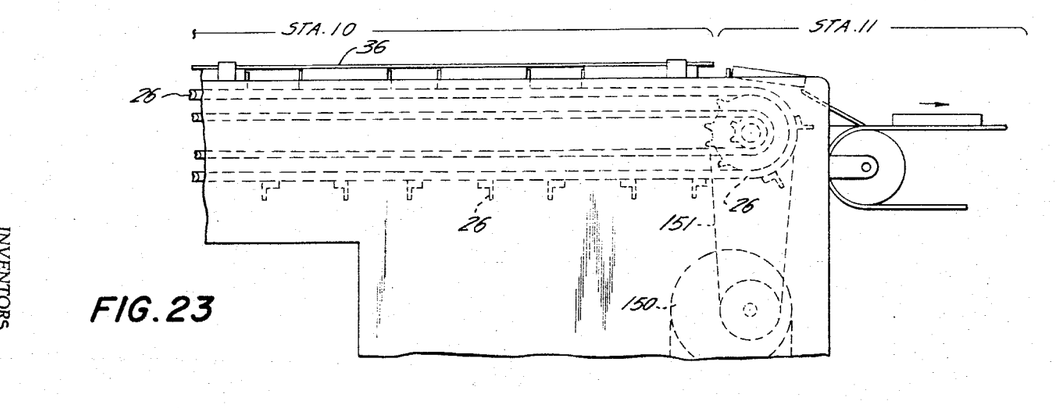
FIG. 23 is a continuation of FIG. 14 illustrating in side elevation station 11 of the machine.

Each of the feeding, forming, and sealing operations of the machine is synchronized by the driving mechanism. As best shown in FIGS. 2, 14 and 23, a main motor 150 (FIG. 23) drives the main conveyor 26 through a suitable power connection 151. The main motor 150 also drives a chain 152 for driving the rear flap kicker mechanism 121 and the closure glue applicator.

At the forward end of the machine in FIGS. 2 and 3, the main conveyor 26 transmits power through shaft 26a, suitable chains and sprockets to the mandrel conveyor 86 (shaft 89), the reduction gear 50 and the stacking chain 40 (shaft 48), the suction cup mechanism 64 (shaft 89) for feeding cartons to the pick up station, and for the shaft 99 which carries the rear dust flap kicker arm 102 and the timing cam for the dust flap gluing nozzle.

The conveyor 115 for delivering food pouches to the filling station is driven by a second main motor 153 illustrated in FIG. 14. Since the food pouches 116 (FIG. 2) are randomly spaced on each filling conveyor, movement of the filling conveyor need not be synchronized with the movement of the remaining components of the machine.

It will be appreciated that applicants' have invented a novel machine and method for efficiently closing an envelope-type package. In developing this machine, individual machine components have been arranged to insure smooth and efficient operation of each of the carton forming steps and carton sealing steps performed by the machine. Throughout machine operation, positive control is retained over the cartons so that the machine is capable of sustained production runs of quality sealed containers.

We claim:

1. A machine for forming and sealing an envelope-type carton from a flat carton blank having triangular closure flaps attached to side walls of the carton comprising means for delivering a carton blank to a device for forming the carton, a device for forming the carton adapted to engage and deliver the carton blank to a series of stations for forming the receptacle portion of the carton, a conveyor for cooperating with said device for forming the container front and rear walls, a pair of spaced guide rails for forming the side walls of the carton, means for applying adhesive for securing together the side walls, means for removing said device from the carton whereby the carton may be filled, means for folding down the leading and trailing closure flaps of the carton, and means for applying adhesive to the side closure flaps for securing the closure flaps together to seal the carton.

2. A machine for forming and sealing a carton comprising means for delivering blanks to a mandrel pickup station, a mandrel for engaging and moving a blank, guide means for holding the blank in engagement with the mandrel, a conveyor moving in timed relation with the mandrel, means on the conveyor for engaging two side walls of the carton blank so to partially form the carton blank about the mandrel, means for moving the remaining side walls into engagement with the mandrel to form the receptacle portion of the carton, means for securing the side walls together at adjacent corners, means for removing the mandrel from the carton, and means for closing and sealing the closure flaps.

3. A machine for forming and sealing a carton with four side walls and four closure flaps comprising means for moving a stack of carton blanks toward a folding station, means for delivering the blanks to a mandrel pickup station, a mandrel for engaging and moving a blank, guide means for holding the blank in engagement with the mandrel, the guide means cooperating with the mandrel for folding the blank partially around the mandrel, a conveyor moving in timed relation with the mandrel, means on the conveyor for engaging two side walls of the carton blank so to partially form the carton blank about the mandrel, means for moving the remaining side walls into engagement with the mandrel to form the receptacle portion of the carton, means for securing the side walls together at adjacent corners, means for removing the mandrel from the carton, and means for closing and sealing the closure flaps.

4. A machine for forming and sealing a carton comprising means for moving a stack of carton blanks toward a feeding station, means for delivering the blanks to a mandrel pickup station, a collapsible mandrel for engaging the front wall of a blank and for moving the blank into guide means which hold the blank in engagement with the mandrel, a conveyor moving in timed relation with the mandrel, means on the conveyor for engaging the front and rear walls of the carton blank so to partially form the carton blank about the mandrel, means for moving the remaining side walls into engagement with the mandrel to form the receptacle portion of the carton, means for securing the side walls together at adjacent corners, means for collapsing and removing the mandrel from the carton, and means for closing and sealing the closure flaps.

5. A machine for forming and sealing a carton comprising means for moving a stack of carton blanks to a feeding station, means for delivering a carton blank to a mandrel pickup station, a pair of retainer bars for holding the carton in position at the mandrel pickup station, a plurality of mandrels adapted to move past the pickup station for engaging and moving a carton blank, means for moving the mandrels in a closed path, guide means cooperating with the moving mandrel for partially forming the carton blank around the mandrel, a conveyor moving in timed relation with said mandrels, lug means on the conveyor for engaging and folding the front and rear walls of each carton blank against the mandrel, guide means for folding the side walls of the blank against the mandrel, means to secure the side walls together to complete the formation of the receptacle portion of the carton, means for collapsing and removing the mandrel from the carton, means for closing the closure flaps attached to the front and rear walls of the carton, means for applying an adhesive to the closure flaps attached to the side walls of the carton, and means for closing and sealing the side wall closure flaps.

6. A machine for forming a flat blank into an open carton comprising means for delivering the blanks to a mandrel pickup station, a carton forming mandrel for engaging the blank at the pickup station, means for moving the mandrel in a closed path, guide means cooperating with the moving mandrel for folding the blank partially around the mandrel, a conveyor moving in timed relation with the mandrel, means on the conveyor for engaging and moving a pair of side walls of the blank into engagement with the mandrel so to partially form the receptacle portion of the carton, means for moving the remaining side walls into engagement with the mandrel, and means for securing the corner portions of the side walls together so to complete formation of the receptacle of the carton.

7. A machine for forming a flat blank into an open carton comprising means for delivering the blanks to a mandrel pickup station, a carton forming mandrel for engaging the blank at the pickup station, means for moving the mandrel in a closed path, guide means cooperating with the moving mandrel for folding the blank partially around the mandrel, a conveyor moving in timed relation with the mandrel, a pair of lugs on the conveyor for engaging and folding the front and rear walls of the blank into engagement with the mandrel so to partially form the receptacle portion of the carton, means for moving the remaining side walls into engagement with the mandrel, means for securing the corner portions of the side walls together so to complete formation of the receptacle of the carton, and means for collapsing and withdrawing the mandrel from the carton.

8. A method for forming and sealing a carton from a flat carton blank having a receptacle portion with a bottom panel, a front wall, a rear wall and a pair of side walls connected to the bottom panel, a dust flap connected to a side wall at each corner of the carton formed by adjacent side walls, and a closure portion having triangular closure flaps connected to the front wall, the rear wall and the side walls comprising the steps of engaging the front wall of a carton blank with a forming mandrel, moving the mandrel through guide means for folding the bottom panel against the mandrel, folding the rear wall against the mandrel, folding and sealing the side walls to the dust flap portions of the carton, collapsing and removing the mandrel from the carton, folding the triangular closure flaps connected to the front and rear walls, applying adhesive to the marginal edges of the triangular flaps connected to the side walls and closing and securing the said last mentioned triangular closure flaps.

References Cited

UNITED STATES PATENTS

| 1,674,921 | 6/1928 | Robinson | 93—44 |
| 2,893,183 | 7/1959 | Currie et al. | 53—183 X |
| 2,949,372 | 9/1960 | Kraft et al. | 53—29 X |
| 2,974,571 | 3/1961 | Windstrup et al. | 93—44 X |
| 3,312,153 | 4/1967 | Hickin | 53—29 X |

THERON E. CONDON, Primary Examiner

R. L. SPRUILL, Assistant Examiner

U.S. Cl. X.R.

53—183; 93—44